United States Patent Office 3,411,939
Patented Nov. 19, 1968

3,411,939
METHOD FOR RENDERING EARTHY MATERIAL IMPERVIOUS TO WATER AND THE PRODUCTS THEREOF
Byron A. Hunter, Woodbridge, and Bogislav Von Schmeling, Hamden, Conn., assignors to Uniroyal, Inc., a corporation of New Jersey
No Drawing. Filed Nov. 9, 1964, Ser. No. 409,978
12 Claims. (Cl. 117—62.1)

ABSTRACT OF THE DISCLOSURE

Earthy material is rendered substantially impervious to water by treating the surface of such material with at least one pound per acre of a phenoxy alkanoic acid, which, when the phenyl ring contains a chlorine substituent, also contains a hydrocarbon substituent with at least 4 carbon atoms on the phenyl ring.

---

This invention pertains to methods for treating earthen formations or strata such as soil, sand, clays and related earthen aggregates to impermeabilize the same against the transmission of water. The invention also relates to the use of such methods in the construction of roads, airport runways, heliports, floors, building foundations, athletic fields and tracks, playgrounds, racetracks, irrigation ditches, ponds, dams, slopes and other structures comprising earthern materials wherein improved impermeability to water is a desired factor. Additionally, the invention relates to the improvement of agricultural soils and to methods of selective soil treatment which reduce the loss of water through evaporation or seepage from soils so treated.

In the construction of roads and airport runways which are to have an earth surface or in which the earth is to serve as a base for the paving, problems are encountered when a rain occurs and renders the soil unsuitable for use as a road or runway surface or renders it unsuitable as a base for paving material. This invention overcomes such difficulties by the simple application of relatively small amounts of soil water repellents to the soil surface when the water content of the soil is at an acceptable level. Thus, this invention enables work to proceed on many types of outdoor construction activities under adverse weather conditions and also provides a ready means for the preparation of road and the like surfaces in relatively inaccessible locations. Also, as indicated above, the invention is applicable to the treatment of athletic fields and tracks, playgrounds, racetracks, bridle paths, heliport pads and other earthen areas where it is desirable to prevent water penetration and mud formation. The invention is useful in promoting water run off and retarding erosion of earthen areas.

It is an object of this invention to impermeabilize earthen formations against the transmission of water by treating such formations with a particular class of organic substances.

It is a further object to utilize these substances in the construction of roads, irrigation ditches and the like in which the construction material is basically earthen materials.

A still further object is the use of these substances in the treatment of agricultural soils so as to drastically reduce the evaporation of water therefrom. Additionally, these substances provide a means of selective placement of water and afford the possibility of optimum utilization of moisture in agricultural applications.

According to this invention, an earthen material is rendered substantially water repellent by incorporating therein an effective amount, normally 0.025–25 lbs./1000 sq. ft. of soil surface, of an organic substance selected from the group comprising phenoxy alkanoic acids, including alkyl phenoxy alkanoic acids. A preferred group of these acids is defined by the following structural formula:

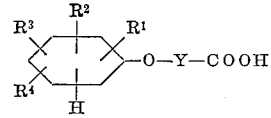

in which $R^1$ and $R^2$ are selected from the group consisting of hydrogen and aliphatic and cycloaliphatic hydrocarbon radicals containing from 1 to 20 carbon atoms, $R^3$ is selected from the group consisting of hydrogen and chlorine, $R^2$ being an aliphatic hydrocarbon radical containing at least 4 carbon atoms when $R^3$ is chlorine, $R^4$ is selected from the group consisting of hydrogen and a divalent aliphatic hydrocarbon radical containing from 1 to 3 carbon atoms and connected to the benzene ring of an identical phenoxy alkanoic acid to form a bis-structure; and Y is a divalent aliphatic hydrocarbon radical selected from the group consisting of

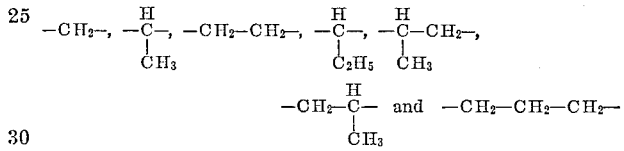

Preferably, at least one aliphtatic hydrocarbon radical containing four or more carbon atoms is attached to the benzene ring in the above formula. The aliphatic radicals can be straight or branched-chain. Normally, those alkyl phenoxy alkanoic acids with normal chain alkyl radicals will be more susceptible to biodegradation in soil than those containing branched alkyl radicals. As is indicated above, other acids suitable for the purposes of this invention include those having a chlorine atom and an aliphatic hydrocarbon radical having at least four carbon atoms attached to the benzene ring. Another group of desirable acids is provided by the compounds in which there are two moieties, as represented by the above structural formula, which are linked together at the benzene rings by a divalent aliphatic hydrocarbon radical to form a bis-structure. While the above structural formula is limited to the cases in which the alkanoic acid is acetic acid, propionic acid or butyric acid, highly satisfactory results in accordance with this invention are obtained when the phenoxy substituent is attached at any position of straight chain and branched-chain alkanoic acids containing up to and including 18 carbon atoms.

Examples of phenoxy, including alkyl phenoxy, alkanoic acids which are effective water repellents in earthen materials are listed below:

phenoxy acetic acid
p-methyl phenoxy acetic acid
p-isopropyl phenoxy acetic acid
p-tertiary butyl phenoxy acetic acid
p-tertiary amyl phenoxy acetic acid
p-octyl phenoxy acetic acid
p-nonyl phenoxy acetic acid
p-dodecyl phenoxy acetic acid
p-(alpha-methyl-nonadecyl) phenoxy acetic acid
2,4-ditertiary amyl phenoxy acetic acid
2,4-disecondary amyl phenoxy acetic acid
2,4-dinonyl phenoxy acetic acid
2-methyl-6-tertiary butyl phenoxy acetic acid
4-cyclohexyl phenoxy acetic acid
2,2'-propane bis(phenoxy acetic acid)
alpha-phenoxy propionic acid alpha-(4-t-butyl phenoxy) propionic acid
beta-(p-octyl phenoxy) propionic acid
alpha-[4-(1,1-dimethyl propyl)phenoxy] butyric acid
alpha-[2,4-di(1,1-dimethyl propyl) phenoxy] butyric acid
2-chloro-4-tertiary butyl phenoxy acetic acid
2-chloro-4-tertiary octyl [ie., 2,2,3,3-tetramethylbutyl] phenoxy acetic acid
alpha-phenoxy caproic acid
alpha-phenoxy stearic acid The foregoing acids are suitably applied to earthen materials by the use of a spray of such acids in the form of a solution or an emulsion. Conventional spray equipment, as used for applying pre-emergence herbicides and other chemicals to soil, is suitably used in the application of the instant acids to earthen material. The spray application can be made from equipment such as a watering can or a high volume discharge spray nozzle using relatively low spray pressure such as 10–100 p.s.i. Sufficient of the solution or emulsion is used so as to desirably result in the application of from 1 to 1000 lbs. of acid per acre in a volume not exceeding 5000 gals. of diluent, the exact amount of acid applied being dependent on the intended end-use of the treated soil, the soil type and the like.

The acids can be applied in the form of organic or aqueous solutions. The organic solvents should be relatively low boiling (maximum boiling point of about 85° C.), so that they will be readily removed by evaporation under ambient conditions after the application of the solution to the soil. Examples of suitable solvents include alcohols, such as methanol and isopropanol, and ketones, such as acetone and methyl ethyl ketone.

The acids are used in the form of their salts in preparing the aqueous solutions. Among the suitable cations for use in the formation of the salts are potassium, sodiub, ammonium, magnesium and calcium. The principal requisite is that the salts be soluble to the desired extent in water. As described below, the acid is released after application of the solution to the soil by applying a dilute inorganic acid to the treated soil.

The acids may also be applied in the form of an emulsion to the soil. It is convenient to first prepare an emulsifiable concentrate, from which the emulsion can be subsequently prepared when and where desired. Any emulsifier, which is not adversely affected by the presence of free acid, is suitable for use in preparing the concentrate. The other component of the concentrate (in addition to the acid) is a slightly water soluble (preferably being soluble to the extent of less than 0.25%) organic solvent, in which the acids suitably have a solubility of from 10 to 50%. Suitable solvents include alcohols, such as sec.-hexyl alcohol, benzyl alcohol and phenylethyl alcohol, and aromatic hydrocarbons, such as benzene, xylene and para-cymene. The concentrate desirably contains from 0.5 to 15.0% of the emulsifier and from 0.5 to 4 lbs. of acid per gallon.

For commercial application of the acids of this invention in the form of sprays, the earthen material should be reasonably dry. If the soil is not reasonably dry at the time of the acid treatment, the time required for the treated layer to become water repellent is prolonged. The soil treated when moist will, after a drying or curing period, become just as water repellent as treated dry soil. It has been found, in general, that it is desirable, before the acid is applied, that the soil moisture content be well below the optimum moisture content (as determined according to ASTM D558-57).

The effective thickness of the treated soil depends on the type of soil, i.e., light sandy soil will allow the acid treating agents to penetrate deeper than will heavy soil. The thickness of the treated soil layer is desirably from ⅛ inch to 1 inch, although greater thicknesses can be used to achieve special or longer lasting effects. Within the specified range of thicknesses, the desired impermeabilizing effect is usually retained for periods of several months.

The acid spray is normally applied to an undisturbed earthen material surface. However, the acid treating agents can be applied to earthen materials as a drench using large quantities of water, such as from 50 to 5000 gals./acre (the exact dilution being dependent upon the desired extent of penetration of the earthen materials), and the acid agents can then be worked into the earthen material by mechanical means. The resulting treated earthen material, which should contain from 0.01 to 1.0 lb. of acid/cu. ft., can then desirably be used in forming layers or strata which are substantially impervious to water. For example, such treated material can be applied around building foundations to substantially prevent water from coming in contact with the foundations.

The effectiveness of phenoxy, including alkyl phenoxy, alkanoic acids as water repellents for soil was demonstrated by using the following testing procedures. The first of these (see Examples 1 and 5) involves the spray application of a dilute solution of the acid in an organic solvent to the surface of air dried sandy loam. After evaporation of the solvent, the water repelling capacity of the soil is measured by the method described. In the second procedure (see Example 2), the acid is applied as a water soluble salt in an aqueous spray; this may desirably be followed by a spray of dilute inorganic acid, such as sulfuric, phosphoric or hydrochloric acid, in an amount sufficient to liberate the free phenoxy alkanoic acid in the soil. In general, the actual amount of inorganic acid used for the liberation of the free phenoxy alkanoic acid will be equal to the amount of the previously applied phenoxy alkanoic acid on a weight basis in a volume not exceeding 5,000 gals. of water. A third, and often preferred, method (see Example 4) is to spray the phenoxy alkanoic acids as water emulsions, prepared from an emulsifiable concentrate, onto the soil or other earthen material.

Example 1

Seven hundred and fifty milligrams of a phenoxy alkanoic acid were dissolved in 25 ml. of isopropyl alcohol to give a concentration of 3.0% by weight of the acid in the solvent. This solution was sprayed onto the soil surface having an area of 28.3 sq. in. of air-dried sandy loam contained in a 6 in. greenhouse pot by means of a De Vilbis #152 atomizer sprayer at about 10 p.s.i. air pressure. This applied amount of acid is equivalent to an application rate of 8.4 lbs. of acid/1000 sq. ft. of soil. After spraying, the pots were transferred to a greenhouse for the purpose of drying the sprayed soil surface. Using a drying time of about 24 hrs., the isopropyl alcohol used in the spray had evaporated and the soil was ready for evaluation of its water repellent capacity. This was accomplished by removing one-half of the treated soil surface to a depth of a bout ½ in. and placing it into a 12 in. long and 1 in. wide circular glass tube to a height of 8 in. The glass tube had previously been sealed on one end with a cotton plug to keep the soil in the tube. An untreated check, i.e., soil without chemical treatment, was also placed in a glass tube in the same manner as described for the treated soil. The glass tubes containing the treated and untreated soil columns were placed in 1 qt. wide mouth glass jars containing 2 in. of water so that the cotton plug and ¼ in. of the soil columns were immersed in the water. After about 1 hr. of immersion, the untreated soil column was completely wet. The soil columns were allowed to stand immersed in water in the indicated manner for a period of 24 hours. After that time, the water repelling effect of the treated soil compared with the untreated control was quantitatively measured. This was done by weighing the tubes and comparing the weight of the soil columns before immersion in water with that taken after the immersion. The weight before immersion in water included the combined weights of glass tube, wet cotton plug and treated soil. The weight after the immersion included the combined weights of glass tube, wet cotton plug and treated soil plus the amount of water taken up by the soil. The results of the soil water repellent effect are expressed in percent soil weight increase after immersion of the soil column in water using the following formula:

$$\left(\frac{A \times 100}{B}\right) - 100 = C$$

where $A$=weight of soil column, glass tube and wet cotton plug after immersion in water;
$B$=weight of soil column, glass tube and wet cotton plug before immersion in water;
$C$=percent of soil weight increase by water absorption of the soil column after immersion in water.

In general, the border line between acceptable (for the purposes of this invention) and unacceptable test results is at about a 1.0% soil weight increase after 24 hours at a 1.0% or 3.0% acid spray concentration.

Table I illustrates the water repellent effect of the specified phenoxy alkanoic acids applied to the soil, in the manner described above, 24 hrs. after immersion in water:

TABLE I

| Acid | Percent conc. in applied solution | C Water absorption, percent soil weight increase |
|---|---|---|
| Untreated soil | | 14.3 |
| p-Methyl phenoxy acetic acid | 3.0 | 0.5 |
| p-Tertiary butyl phenoxy acetic acid | 3.0 | 0.3 |
| 2,4-ditertiary amyl phenoxy acetic acid | 0.5 | 0.5 |
| Do | 1.0 | 0.3 |
| Do | 2.0 | 0.3 |
| Do | 3.0 | 0.2 |
| p-Tertiary octyl phenoxy acetic acid | 0.5 | 2.3 |
| Do | 1.0 | 0.5 |
| Do | 2.0 | 0.2 |
| Do | 3.0 | 0.2 |
| p-Nonyl phenoxy acetic acid | 0.5 | 0.9 |
| Do | 1.0 | 0.6 |
| Do | 2.0 | 0.2 |
| Do | 3.0 | 0.3 |
| 2,4-dinonyl phenoxy acetic acid | 1.0 | 0.6 |
| Do | 3.0 | 0.4 |
| Mono(alpha-methylheptadecyl) phenoxy acetic acid | 1.0 | 0.9 |
| Do | 2.0 | 0.5 |
| Do | 3.0 | 0.5 |
| Alpha-(4-t butyl phenoxy) propionic acid | 3.0 | 1.0 |
| Beta-(p-octyl phenoxy) propionic acid | 0.5 | 0.9 |
| Do | 1.0 | 0.3 |
| Do | 3.0 | 0.3 |
| Alpha-[4-(1,1-dimethyl propyl) phenoxy] butyric acid | 3.0 | 0.9 |
| Alpha-[2,4-di(1,1-dimethyl propyl) phenoxy] butyric acid | 0.5 | 0.8 |
| Do | 1.0 | 0.4 |
| Do | 3.0 | 0.3 |
| Alpha-(p-tertiary octyl-phenoxy) caproic acid | 1.0 | 0.5 |
| Do | 2.0 | 0.4 |
| Do | 3.0 | 0.3 |
| Alpha-(p-tertiary octyl-phenoxy) stearic acid | 1.0 | 0.6 |
| Do | 2.0 | 0.3 |
| Do | 3.0 | 0.3 |
| 2-chloro-4-tertiary butyl phenoxy acetic acid | 0.5 | 1.3 |
| Do | 3.0 | 1.1 |
| Do | 0.5 | 0.3 |
| Do | 1.0 | 0.2 |
| Do | 3.0 | 0.2 |

Example 2

In this test, the phenoxy alkanoic acids were applied to the soil surface as water soluble salts, this application being followed with a spray of a dilute acid in the following way:

Two hundred and fifty milligrams of the acid to be tested were placed in a 125 ml. Erlenmeyer flask. To this amount of acid, 2 ml. concentrated NH$_4$OH were added to form the water soluble ammonium salt. This salt was then dissolved in water and diluted to a volume of 25 ml. to give a concentration of acid equivalent to 1.0% of acid in the water solution. The application to the soil was then made in the same manner as described in Example 1. To this treated soil surface, 25 ml. of a 0.1% solution (250 mg./25 ml.) of HCl were applied by spraying with a De Vilbis #152 atomizer at 10 p.s.i. air pressure. The amount of water repellent chemical applied from a 1.0% concentration in water is equivalent to an application rate of 2.8 lbs. of acid/1000 sq. ft. of soil. After spraying, the pots containing the treated soil were transferred to a greenhouse and the soil was allowed to dry for a period of twenty-four hours. The water repellent effect was then measured in the same way as described in Example 1 by determining the weight of the treated soil before and after immersion in water. An untreated soil check, i.e., soil without receiving a chemical spray, was included in the test.

Table II illustrates the effect of the water repelling chemical, applied to the soil in the manner described above, 24 hours after immersion of the soil in water:

TABLE II

| Acid | Percent conc. in applied solution | C Water absorption, percent soil weight increase |
|---|---|---|
| Untreated | | 13.2 |
| p-Methyl phenoxy acetic acid | 1.0 | 0.4 |
| p-Isopropyl phenoxy acetic acid | 1.0 | 0.4 |
| p-Tertiary butyl phenoxy acetic acid | 1.0 | 0.6 |
| 2,4-diamyl phenoxy acetic acid | 1.0 | 0.2 |
| p-Tertiary octyl phenoxy acetic acid | 1.0 | 0.2 |
| p-Cyclohexyl phenoxy acetic acid | 1.0 | 0.4 |
| 2,2'-Propane bis(phenoxy acetic acid) | 1.0 | 0.5 |
| Alpha-(4-t butyl phenoxy) propionic acid | 1.0 | 0.5 |
| Alpha-[4-(1,1-dimethyl propyl) phenoxy] butyric acid | 1.0 | 0.4 |

Example 3

A flat of dry, washed sea sand (salt-free) was sprayed with a 3% by weight solution of p-nonyl phenoxy acetic acid in isopropyl alcohol in the manner described in Example 1. After drying for twenty-four hours at room temperature, the upper half inch layer was removed and placed in a glass tube as described. A similar tube was prepared containing untreated sand. The lower end of each tube was immersed in water for twenty-four hours, as described in Example 1. The tubes were weighed before and after the water treatment. The following data were obtained.

```
                                    Water absorption percent
                                       soil weight increase
Untreated sand _____ 8.5
Sand plus p-nonyl phenoxy acetic acid _____ 0.5
```

The low uptake of water in the soil and sand samples treated with the water repelling agents of this invention in the above examples demonstrates the effectiveness of the phenoxy alkanoic acids in this application.

Example 4

This example relates to the use of phenoxy alkanoic acids for the reduction of agricultural soil water loss.

Samples A and B were prepared by dissolving 200 milligrams of p-nonyl phenoxy acetic acid and p-tertiary octyl phenoxy acetic acid, respectively, in 300 ml. of isopropyl alcohol. Sample C was prepared by adding 1.6 grams of a 12.5% active emulsifiable concentrate (see composition below) to 300 ml. of water. The emulsifiable concentrate, having 1 lb./gal. of the phenoxy acetic acid, has the following composition:

```
                                           Percent by weight
p-Tertiary octyl phenoxy acetic acid (technical,
   i.e., 85% purity or higher) _____ 13.24
Dimethyl sulfoxide _____ 13.24
Emcol H-500-B _____ 2.204
Solvent naphtha _____ 71.316
                                                  _____
                                                   100.00
```

Emcol H-500-B is a blend of oil soluble calcium sulfonates with polyoxyethylene ethers.

Each of the above samples was applied to the soil surface of sandy loam in a 2 square foot greenhouse flat in an amount equivalent to 10 lbs. of phenoxy alkanoic acid per acre. The application was effected by the use of a spray gun as in the previous examples. Prior to the application of the phenoxy alkanoic acid to the soil surface of the flats, corn seed and tomato plants were planted in the loam in each of the flats, while weed seeds were placed on the loam surfaces.

Twenty-four hours after the treatment with the phenoxy alkanoic acids, the flats were exposed to sub-irrigation until untreated control flats, i.e., flats which had not received a treatment with a phenoxy alkanoic acid, were completely wet. The flats then remained in a greenhouse without additional watering for a period of 2 weeks. At that time, records were made as to the difference of the appearance of the corn and tomato plants in the acid treated flats and that of the plants in the untreated control. The results were as follows:

| Sample | Rate of phenoxy alkanoic acid application (lbs./acre) | Wilting of plants |
|---|---|---|
| A | 12.5 | None |
| A | 25.0 | None |
| A | 100.0 | None |
| B | 10.0 | Trace |
| B | 20.0 | Trace |
| C | 10.0 | Trace |
| C | 20.0 | Trace |
| Untreated Control. | | Severe |

These results show that the treatments with the phenoxy alkanoic acids prevented the wilting of the plants by reducing soil water loss. The observation of the treated flats continued for an additional week, and it was noted that the plants did not require the addition of water during that period in order to avoid wilting.

At the time of making the observations recorded in the preceding tabulation, the following observations were made concerning the weed control experiment. "Percent Weed Control" is based on a comparison of the treatments with the untreated check. The latter is given a value of 0%. Ground with no weeds is given a value of 100%. These and the intermediate values are determined by visual observation and estimation.

| Sample | Rate of phenoxy alkanoic acid application (lbs./acre) | Percent Weed control | |
|---|---|---|---|
| | | Broadleaves [1] | Grasses [2] |
| A | 12.5 | 30.0 | 30.0 |
| A | 25.0 | 90.0 | 80.0 |
| A | 100.0 | 98.0 | 98.0 |
| B | 10.0 | 100.0 | 99.5 |
| B | 20.0 | 100.0 | 99.0 |
| C | 10.0 | 100.0 | 99.0 |
| C | 20.0 | 100.0 | 99.0 |
| Untreated control | | 0 | 0 |

[1] Broad leaf weeds:
  Pigweed (*Amaranthus retroflexus*)
  Purslane (*Portulaca oleracea*)
  Quickweed (*Galinsoga ciliata*)
  Ragweed (*Ambrosia artemisifolia*)
  Lambsquarter (*Chenopodium album*)
[2] Grassy weeds:
  Crabgrass (*Digitaria ischaemum*)
  Barnyard grass (*Echinochloa crusgalli*)
  Foxtail (*Setaria glauca*)

These test results show that the germination of the weed seeds was prevented because the treatment of the loam surfaces with the phenoxy alkanoic acids prevented water from reaching the seeds.

Example 5

The procedure of Example 1 was repeated with the modifications detailed below. The soil weight increase through water absorption was checked at intervals over a period of five months. During the fourth and fifth months of this period, the samples under test were placed in a tropical chamber at 86° F. and 100% relative humidity. This latter step was taken to accelerate possible chemical breakdown of the acids under test by intensifying microbial action under conditions favorable to such action. The concentration of the test acids in the applied solution was 3.0% by weight. The observed results were as follows:

| Acid | C Water absorption, Percent soil weight increase at the end of— | | | | | | |
|---|---|---|---|---|---|---|---|
| | 1 day | 1 week | Months | | | | |
| | | | 1 | 2 | 3 | 4 | 5 |
| p-Nonyl phenoxy acetic acid | 0.38 | 0.43 | 0.48 | 0.48 | 0.48 | 0.5 | 0.5 |
| Lauric acid | 0.44 | 0.54 | 1.67 | 3.58 | 5.35 | 16.7 | 16.7 |
| Stearic acid | 0.65 | 0.74 | 0.89 | 3.13 | 3.33 | 11.2 | 12.7 |
| Untreated soil | 15.7 | 16.0 | 16.1 | 17.0 | 17.5 | 17.5 | 17.5 |

These results demonstrate that the alkanoic acids without the phenoxy substituent broke down chemically in the soil, whereas p-nonyl phenoxy acetic acid was not adversely affected under the conditions of this test.

This utilization of phenoxy alkanoic acids to prevent agricultural soil water loss is of special utility, in low rainfall areas where sub-irrigation is available, on such crops as corn, soybeans, snap beans, cotton, tobacco, sugar beets and the like. It is recommended that the acids be applied by direct spray prior to the emergence of the crops.

This invention provides a useful method for sealing off layers of earthen materials from the substantial passage of water into and through same. Thus, this invention is applicable to situations where it is desired to prevent the penetration of water into earthen formations and also to the prevention of water escape from agricultural soils which are watered by sub-irrigation.

Having thus described our invention, what we claim and desire to protect by Letters Patent is:

1. The method of rendering earthy material substantially impervious to water which comprises treating the surface of said material with at least one pound of a phenoxy alkanoic acid per acre, in which said phenoxy alkanoic acid is selected from the group consisting of acids represented by the following formula:

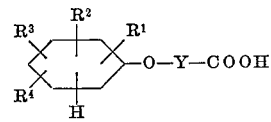

in which $R^1$ and $R^2$ are selected from the group consisting of hydrogen and aliphatic and cycloaliphatic radicals containing from 1 to 20 carbon atoms, $R^3$ is selected from the group consisting of hydrogen and chlorine, $R^2$ being an aliphatic hydrocarbon radical containing at least 4 carbon atoms when $R^3$ is chlorine, $R^4$ is selected from the group consisting of hydrogen and a divalent aliphatic hydrocarbon radical containing from 1 to 3 carbon atoms and connected to the benzene ring of an identical phenoxy alkanoic acid to form a bis-structure, and Y is a divalent aliphatic hydrocarbon radical selected from the group consisting of

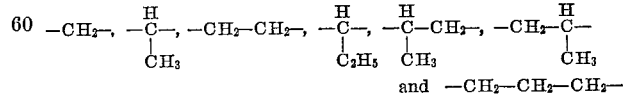

and $-CH_2-CH_2-CH_2-$

2. The method of claim 1 in which the surface of said earthy material is treated with at least 10 lbs. of said phenoxy alkanoic acid per acre.

3. The method of claim 2, in which said acid is an alkylated phenoxy alkanoic acid, and Y contains from 2 to 18 carbon atoms.

4. The method of claim 2, in which said acid is a dialkyl phenoxy acetic acid.

5. The method of claim 2, in which said acid is p-tertiary-octyl phenoxy acetic acid.

6. The method of claim 2, in which said acid is p-nonyl phenoxy acetic acid.

7. The method of claim 2, in which said acid is 2,4-ditertiary amyl phenoxy acetic acid.

8. The method of claim 2, in which said acid is applied to the surface of said earthy material in an amount of from 0.23 to 25 lbs. of acid per 1000 sq. ft. of said surface.

9. The method of claim 2, in which said acid is applied to said earthy material by spraying same with a solution of from 10 to 1000 lbs. of said acid in up to 5000 gals. of an organic solvent per acre, which solvent is subsequently removed by evaporation at ambient temperatures.

10. The method of claim 2, in which said acid is applied to said earthy material by spraying same with an aqueous solution of a water-soluble salt of said acid, said solution containing the equivalent of 10 to 1000 lbs. of free acid in up to 5000 gals. of water per acre, the free alkanoic acid being liberated in said material by subsequently spraying same with a dilute inorganic acid.

11. The method of claim 2, in which said acid is applied to said earthy material by spraying same with an aqueous emulsion of from 10 to 1000 lbs. of said acid in up to 5000 gals. of the other emulsion components per acre.

12. A barrier layer, which is substantially impervious to the passage of water, comprising a ⅛ inch to one inch thick layer of earthy material to which has been applied from 0.025 to 25 lbs. of a phenoxy alkanoic acid per 1,000 sq. ft. of the surface of said layer, in which said phenoxy alkanoic acid is selected from the group consisting of acids represented by the following formula:

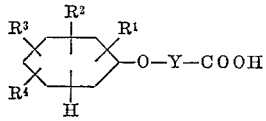

in which $R^1$ and $R^2$ are selected from the group consisting of hydrogen and aliphatic and cycloaliphatic radicals containing from 1 to 20 carbon atoms, $R^3$ is selected from the group consisting of hydrogen and chlorine, $R^2$ being an aliphatic hydrocarbon radical containing at least 4 carbon atoms when $R^3$ is chlorine, $R^4$ is selected from the group consisting of hydrogen and a divalent aliphatic hydrocarbon radical containing from 1 to 3 carbon atoms and connected to the benzene ring of an identical phenoxy alkanoic acid to form a bis-structure, and Y is a divalent aliphatic hydrocarbon radical selected from the group consisting of

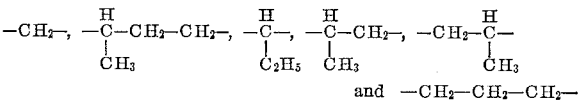

and $-CH_2-CH_2-CH_2-$

References Cited

UNITED STATES PATENTS

| | | | |
|---|---|---|---|
| 2,739,052 | 3/1956 | Morrill | 71—2.6 X |
| 3,208,843 | 9/1965 | Guth | 71—2.6 |
| 3,231,398 | 1/1966 | Pauli | 106—16 |
| 3,284,186 | 11/1966 | Pass et al. | 71—2.6 |

FOREIGN PATENTS

| | | |
|---|---|---|
| 596,869 | 4/1960 | Canada. |
| 5,597,692 | 6/1960 | Canada. |

JULIUS FROME, *Primary Examiner.*

L. B. HAYES, *Assistant Examiner.*